United States Patent [19]

Onishi et al.

[11] Patent Number: 4,907,668
[45] Date of Patent: Mar. 13, 1990

[54] STEERING TORQUE DETECTING APPARATUS

[75] Inventors: Masayoshi Onishi; Hisato Umemaru; Hiromasa Ozawa, all of Hyogo, Japan

[73] Assignee: Mitsubishi Denki Kabushiki Kaisha, Tokyo, Japan

[21] Appl. No.: 314,682

[22] Filed: Feb. 22, 1989

[30] Foreign Application Priority Data

Feb. 25, 1988 [JP] Japan .................................. 63-45076
Feb. 25, 1988 [JP] Japan .................................. 63-45080
Feb. 25, 1988 [JP] Japan .................................. 63-45081
Feb. 25, 1988 [JP] Japan .................................. 63-45082

[51] Int. Cl.⁴ .............................................. B62D 5/04
[52] U.S. Cl. .................................... 180/142; 180/79.1; 73/862.33; 74/388 PS
[58] Field of Search ...................... 180/79.1, 141, 142; 73/118.1, 862.33; 74/388 PS; 361/397

[56] References Cited

U.S. PATENT DOCUMENTS

| | | | |
|---|---|---|---|
| 4,448,275 | 5/1984 | Kitagawa et al. | 180/142 X |
| 4,660,671 | 4/1987 | Behr et al. | 180/79.1 |
| 4,715,220 | 12/1987 | Eitoku et al. | 73/118.1 |
| 4,716,983 | 1/1988 | Adams et al. | 180/142 |
| 4,724,915 | 2/1988 | Morishita et al. | 180/79.1 |
| 4,736,810 | 4/1988 | Morishita et al. | 180/79.1 |
| 4,838,074 | 6/1989 | Morishita et al. | 73/862.33 X |

*Primary Examiner*—Charles A. Marmor
*Assistant Examiner*—Alan M. Kagen
*Attorney, Agent, or Firm*—Sughrue, Mion, Zinn, Macpeak and Seas

[57] ABSTRACT

A steering torque detecting apparatus for use in an electrically-operated power steering system of a vehicle. Flexural load which is applied between a pair of input and output shafts during a steering operation is absorbed by the contact between a printed board and the end of a boss portion of a mounting ring for mounting a slider, thereby preventing displacement of the position of contact of the slider with a potentiometer element. The mounting ring is provided with an elastically deformable cylindrical collar portion which surrounds the slider and the printed board is movably disposed inside the cylindrical collar portion to thereby prevent intrusion of foreign matter into the area of contact between the slider and the printed board. A bush for supporting the printed board is rigidly secured to either the input or output shaft through engagement between a positioning groove and a fixing pin and engagement of a bent end portion of the bush with a groove provided in the shaft.

11 Claims, 9 Drawing Sheets

STEERING TORQUE DETECTING APPARATUS

BACKGROUND OF THE INVENTION

The present invention relates to a steering torque detecting apparatus for use in an electrically-operated power steering system of a vehicle such as an automobile. More particularly, the present invention pertains to an improved steering torque detecting apparatus of this type which is designed to prevent generation of an erroneous detection signal due to flexural load applied between a pair of input and output shafts and to an improved steering torque detecting apparatus wherein a mounting ring for mounting a slider and a skip ring part having a printed board mounted thereon are movably coupled to each other so that storage and transportation of these members are facilitated. The present invention is also concerned with an improvement in a slip ring part which is fitted on a pair of input and output shafts in a steering torque detecting apparatus of the type described above.

FIG. 16 is a longitudinal sectional view of the conventional steering torque detecting apparatus disclosed in Japanese Utility Model Application No. 62-91811 (1987). In FIG. 16, reference numerals 1 and 2 denote input and output shafts, respectively, which constitute in combination a steering shaft, while numeral 3 denotes a torsion bar which couples together the input and output shafts 1 and 2, and numeral 4 denotes a fixing pin. Reference numeral 6 denotes a first housing which is supported by a stationary part (not shown) and which supports the input shaft 1 through a bearing 8, and numeral 7 a second housing which is coupled to the housing 6 by means of a securing screw 10 and which supports the output shaft 2 through a bearing 9.

Reference numeral 11 denotes a support ring for the slip ring which is molded from a synthetic resin material and which is rigidly secured to the input shaft 1, the support ring 11 being provided with a flange portion 11a. Reference numeral 12 denotes a plurality of slip rings buried in the support ring 11. Connecting wires 13 are led out from the respective slip rings 12.

Reference numeral 14 denotes a disc-shaped printed board which is secured to the flange portion 11a. The printed board 14 has a potentiometer element formed on one side thereof which is provided with a circumferential resistance layer and a plurality of electrodes. Reference numeral 17 denotes a mounting ring which is made of an insulating material and secured by means of a mounting screw 18, while numeral 16 denotes a slider which is secured to the mounting ring 17 so as to extend axially, the slider 16 being in contact with both the resistance layer and electrodes of the potentiometer element 15.

Reference numeral 19 denotes a brush device which is arranged as follows. Reference numeral 20 denotes a brush holder which is made of an insulating material and is secured to the housing 6. Numeral 21 denotes brushes made of resilient thin metallic wires having good electrical conductivity. The distal ends of the brushes 21 are in tangential contact with the respective slip rings 12, while the proximal ends of the brushes 21 are rigidly secured to respective terminals 22. The terminals 22 are buried in the brush holder 20 and connected to lead wires 24 through capacitors 23. Reference numeral 25 denotes a cover.

The above-described conventional torque detecting apparatus operates as follows. When no steering operation is being conducted, no torsion is generated in the torsion bar 3 and there is therefore no change in the output from the potentiometer that detects the level of torque.

When the steering wheel is turned, the torsion bar 3 is torsionally deformed and the position of contact of the slider 16 with the resistance layer is displaced from a neutral point in proportion to the amount of torsional deflection of the torsion bar 3, and an output signal which is proportional to the amount of displacement of the contact position of the slider 16 is thus obtained from the potentiometer. In accordance with the amount and direction of torque detected in this way, an electric motor for the steering operation is driven to assist the output shaft 2 to rotate in the detected direction.

The conventional steering torque detecting apparatus of the type described above suffers, however, from the following problems. Namely, not only torsion but also flexural load is transmitted from the input shaft 1 to the output shaft 2 and therefore the amount of displacement of the contact position of the slider 16 with respect to the resistance layer of the potentiometer element 15 which corresponds to the level of the flexural load is also included in the output. Therefore, the output signal represents a higher level of torque than what is actually being applied. Accordingly, the driving output from the steering motor becomes excessively high, resulting in a greater amount of assistance being given than the amount required by the driver turning the steering wheel.

Further, when the steering wheel is turned, torsion is generated in the torsion bar 3 and flexural load is also applied between the input and output shafts 1 and 2. The flexural load causes a change in the parallel relationship between the surface of the printed board 14 and the surface of the mounting ring 17 which faces it and the position of contact of the slider 16 with the resistance layer of the potentiometer element 15 is therefore displaced, which results in an erroneous detection signal that includes an error in addition to a signal representative of the level of the actually applied torque. Generation of such an erroneous detection signal obstructs achievement of stable steering.

In the above-described conventional steering torque detecting apparatus, the mounting ring having the slider mounted thereon and the slip ring part having the printed board secured thereto are combined together as a pair of parts. However, these two parts are stored and transported as separate structures and there are therefore problems in handling, management and transportation of the two parts. More specifically, foreign matter is likely to adhere to the slider and the resistance layer provided on the surface of the potentiometer element formed on the printed board during storage and transportation of the parts, and a great deal of time and labor is needed to pack the parts. In addition, since the mounting ring and the printed board are separate from each other even after they have been assembled to the input and output shafts, there is a risk of foreign matter, e.g., dust or oil for bearing, entering the area of contact between the slider and the resistance layer.

In the prior art apparatus, the slip ring supporting ring 11 is molded from a thermosetting synthetic resin material and press-fitted on the input shaft 1. Therefore, if the degree of interference is excessive, the support ring 11 may be cracked, whereas, if the degree of interference is too small, the fitting engagement between the support ring 11 and the input shaft 1 will be loose. Accordingly, it is necessary to conduct machining with a precise tolerance in order to obtain an optimal level of interference at which no looseness will be produced even if there is thermal expansion or contraction. If the degree of interference is excessive, the outer diameter of the support ring 11 is increased when press-fitted on the input shaft 1, which results in the slip rings 12 being subjected to stress and therefore becoming liable to crack. Further, the circumferential position of the resistance layer formed on the printed board 14 needs to be set at a predetermined position with respect to the input shaft 1. Since the support ring 11 is simply press-fitted on the input shaft 1, although the printed board 14 is mounted on the flange 11a while being circumferentially positioned with respect to it, it is necessary to conduct high precision assembly so that the circumferential position of the resistance layer is set in a predetermined position with respect to the input shaft 1 when the support ring 11 is press-fitted on the shaft 1.

SUMMARY OF THE INVENTION

It is an object of the present invention to provide a steering torque detecting apparatus which enables stable steering without any risk of displacement of the position of contact between of the slider and the potentiometer even when flexural load is applied between the input and output shafts during a steering operation.

It is another object of the present invention to provide a steering torque detecting apparatus wherein, even when flexural load is applied between the input and output shafts, there is no displacement of the position of contact between the slider and the resistance layer formed on the potentiometer so that only the level of the actually applied torque is detected, and wherein the slider is brought into contact with the potentiometer element under a predetermined level of pressure derived from a spring, thus enabling stable steering.

It is still another object of the present invention to provide a steering torque detecting apparatus which is so designed that the slip ring having the printed board secured thereto and the mounting ring part having the slider mounted thereon can be stored and transported in one unit to thereby prevent adhesion of foreign matter to the parts during storage or transportation and also prevent intrusion of foreign matter such as dust or oil into the area of contact between the slider and the resistance layer even after these parts have been attached to the input and output shafts.

It is a further object of the present invention to provide a steering torque detecting apparatus which is so designed that the slip ring supporting ring is readily fitted on the input shaft without any risk of failure such as cracking, thereby eliminating any fear of the slip rings being fractured, and it is possible to position the printed board with respect to the input shaft in the circumferential direction with a high degree of accuracy.

To these ends, the present invention provides a steering torque detecting apparatus wherein the mounting ring for mounting the slider is comprised of a boss portion, a flange portion, a cylindrical projecting portion extending axially from the outer end of the flange portion, the projecting portion being formed so as to be elastically compressible in the axial direction. The mounting ring is disposed between the printed board mounted on one shaft and the other shaft such that the projecting portion is elastically compressed, and the boss portion is movably fitted on the first shaft and concentrically supported thereon. The end of the boss portion is brought into contact with the printed board under pressure. The projecting portion of the mounting ring is so fixed to the second shaft by fixing means that the mounting ring is prevented from circumferentially moving relative to the second shaft.

A spring member may be employed to press the flange portion from the outer end thereof toward the printed board so as to hold the end of the boss portion in contact with the printed board under pressure. The slider is brought into contact with the resistance layer of the potentiometer element formed on the printed board under a predetermined level of spring pressure. The projecting portion of the mounting ring is so fixed to the second shaft by fixing means that the mounting ring is prevented from circumferentially moving relative to the second shaft.

Thus, since the end of the boss portion of the mounting ring is held in contact with the printed board by means of the elastic compressive force derived from the cylindrical projecting portion, even when flexural load is applied between the input and output shafts, there is no circumferential displacement of the position of contact between the slider and the resistance layer of the potentiometer element formed on the printed board. Accordingly, only the level of torsional deflection is detected and an accurate detection signal is therefore obtained. In the case where the mounting ring is pressed against the printed board by means of a spring member also, the slider is held in contact with the resistance layer of the potentiometer element under a predetermined level of pressure and therefore the displacement of the slider represents torsional deflection only. Accordingly, an accurate detection signal is similarly obtained.

According to another of its aspects, the present invention provides a steering torque detecting apparatus wherein the mounting ring has a cylindrical collar portion provided at one end of the flange portion thereof and an edge portion projecting radially inward from the end of the collar portion and wherein the slider is secured to the inner end face of the flange portion and the printed board is secured to a flange portion of a support ring constituting a slip ring part, the flange portion of the support ring being movably fitted inside the collar portion of the mounting ring and prevented form disengaging from the mounting ring by the edge portion provided on the collar portion. Accordingly, the mounting ring having the slider mounted thereon and the slip ring part having the printed board secured thereto are stored and transported in one unit. Thus even after these members have been attached to the input and output shafts, the area of contact between the slider and printed board is closed and the intrusion of foreign matter is thus prevented.

According to yet another of its aspects, the present invention provides a steering torque detecting apparatus wherein a support ring is formed on the outer peripheral portion of a metallic bush by a molding process using a synthetic resin material. The support ring has slip rings buried in the outer peripheral portion thereof and a flange portion provided at one end thereof. The printed board is fitted to a bush and circumferentially positioned by means of the flange portion of the support ring. The bush is fitted on one shaft and positioned circumferentially through engagement between a positioning groove provided in one end portion of the bush and a fixing pin which is rigidly secured to said shaft. One end portion of the bush is bent so as to engage with a groove provided in the outer periphery of said shaft, thereby preventing the bush from disengaging from the shaft. Accordingly, the support ring is formed integrally with the bush by a molding process and fitted on the shaft, e.g., the input shaft, through the bush. Therefore, only a small degree of interference is required to prevent generation of looseness. The bush is reliably positioned both circumferentially and axially through engagement with the fixing pin and engagement groove which are provided on the input shaft.

DESCRIPTION OF PREFERRED EMBODIMENTS

Figure 1:
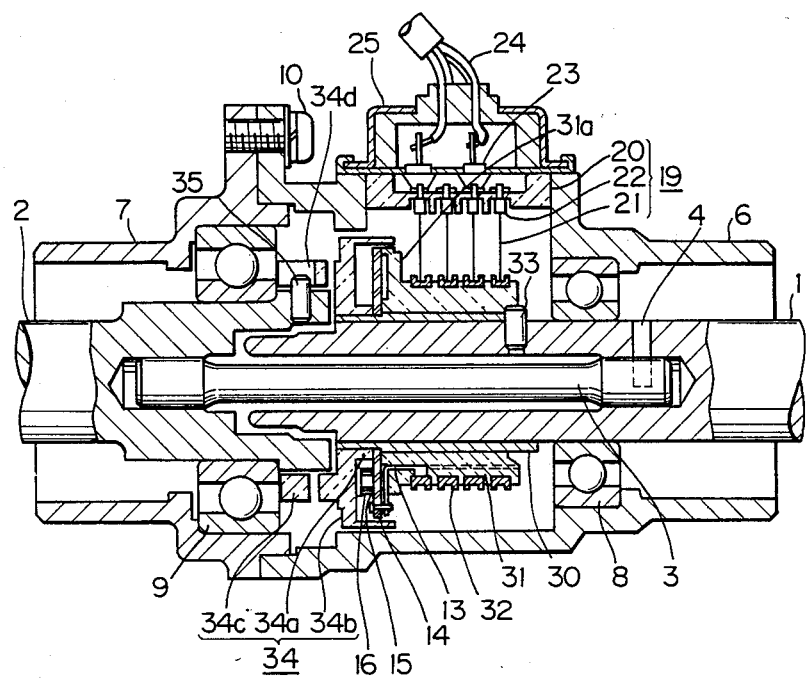
FIG. 1 is a longitudinal sectional view of one embodiment of the steering torque detecting apparatus according to the present invention.
Figure 16:
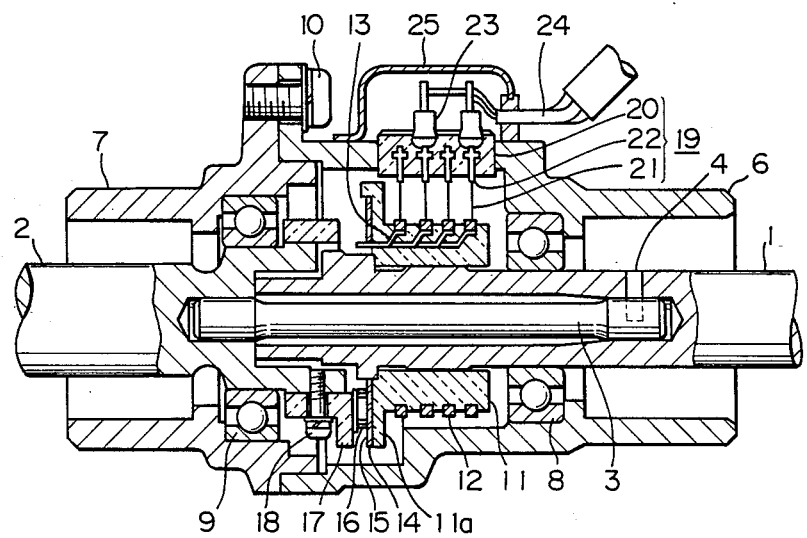
FIG. 16 is a longitudinal sectional view showing an essential part of a conventional steering torque detecting apparatus.

FIG. 1 is a longitudinal sectional view of a first embodiment of the steering torque detecting apparatus according to the present invention. In FIGS. 1 to 5, the reference numerals 1 to 4, 6 to 10, 13 to 16 and 19 to 25 denote members which are identical or equivalent to those in the prior art apparatus shown in FIG. 16. The reference numeral 30 denotes a bush made of a metallic material which has a slip ring support ring 31 formed on the outer periphery thereof by a cast molding process using a synthetic resin material. The support ring 31 has slip rings 32 buried therein and also has a flange portion 31a provided at one end thereof. The slip ring support ring 31 is fitted on the input shaft 1 through the bush 30 and positioned circumferentially by means of a fixing pin 33.

The reference numeral 34 denotes a mounting ring molded from a nonrigid synthetic resin material, for example, a polyacetal material. The mounting ring 34 comprises a boss portion 34a, a flange portion 34b and a cylindrical projecting portion 34c. The boss portion 34a is movably fitted on the bush 30 and supported concentrically with respect to it. A slider 16 is secured to the inner end face of the flange portion 34b. The distal end of the slider 16 is in resilient contact with the resistance layer and electrodes provided on the potentiometer element 15 formed on the printed board 14. The cylindrical projecting portion 34c extends axially from the outer end of the flange portion 34b. The outer end of the projecting portion 34c abuts against the end of the inner ring of the bearing 9. The projecting portion 34c is provided with an engagement groove 34d which opens at the outer end thereof. The engagement groove 34d is engaged with a fixing pin 35 which is rigidly secured to the output shaft 2, thereby fixing the projecting portion 34c so that the mounting ring 34 is prevented from moving circumferentially relative to the output shaft 2. Accordingly, the mounting ring 34 is rotated together with the output shaft 2 as one unit.

Figure 2:
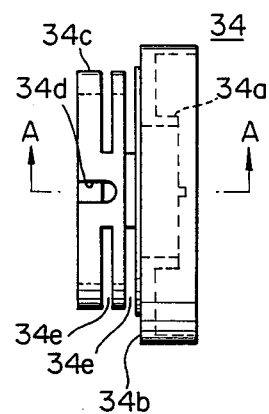
FIG. 2 is a side view of the mounting ring shown in FIG. 1.
Figure 3:
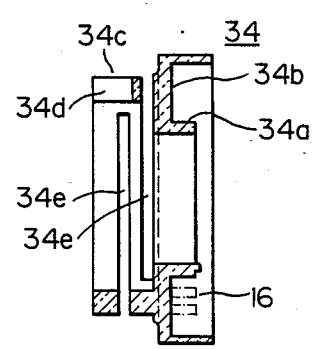
FIG. 3 is a sectional view taken along the line A—A of FIG. 2.

FIG. 2 is a side view of the mounting ring 34 shown in FIG. 1, while FIG. 3 is a sectional view taken along the line A—A of FIG. 2. The cylindrical projecting portion 34c is provided with a plurality of slits 34e (two slits being shown in FIGS. 2 and 3) which are spaced apart from each other in the axial direction, each slit 34e extending circumferentially through a relatively wide angle. Each pair of adjacent slits 34e are disposed in such a manner that the respective circumferential centers of the slits 34e are offset from each other at 180 degrees, thereby enabling the projecting portion 34c to be elastically compressed in the axial direction.

As shown in FIG. 1, the mounting ring 34 is disposed in between the inner ring of the bearing 9 and the printed board 14 with the projecting portion 34c compressed therebetween. Therefore, the end of the boss portion 34a is held in contact with the surface of the printed board 14 under pressure, thus enabling the slider 16 to be resiliently pressed against the resistance layer of the potentiometer element 15 stably at all times.

In the first embodiment of the present invention shown in FIGS. 1 to 3, the end of the boss portion 34a of the mounting ring 34 projects axially from the inner end face of the flange portion 34b so as to be held in contact with the surface of the printed board 14 under pressure, so that, even when flexural load is applied between the input and output shafts 1 and 2 due to a steering operation, the slider 16 is held in contact with the resistance layer of the potentiometer 15 without being displaced circumferentially. Therefore, the displacement of the slider 16 only represents the level of torsional deflection, which enables an accurate detection signal to be obtained.

Figure 4:
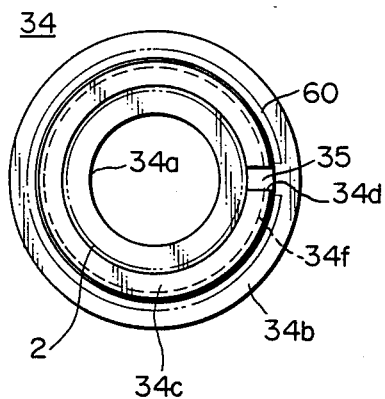
FIGS. 4 and 5 are front and side views, respectively, of a mounting ring employed in a second embodiment of the steering torque detecting apparatus according to the present invention.
Figure 5:
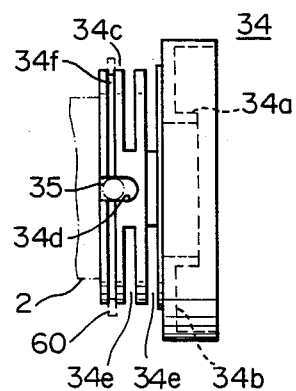

FIGS. 4 and 5 are front and side views, respectively, of a mounting ring employed in a second embodiment of the present invention. In this embodiment, an annular groove 34f is provided in the outer peripheral portion of the cylindrical projection portion 34c of the mounting ring 34, and a spring ring 60 which is defined, for example, by a snap ring is fitted in the annular groove 34f.

The width of the engagement groove 34d is reduced by means of the pressure derived from the spring ring 60, thereby enabling the engagement groove 34d to engage with the fixing pin 35 secured to the output shaft 2 without leaving any gap. Therefore, when the output shaft 2 is rotated, the mounting ring 34 is rotated together with the output shaft 2 as one unit without any looseness. Thus, the degree of detection accuracy is increased.

Although in the first and second embodiments the slip rings 32 and the printed board 14 are fitted on the input shaft 1, while the mounting ring 34 is fixed on the output shaft 2 so that the mounting ring 34 is prevented from moving circumferentially relative to the output shaft 2, these arrangements of the members fitted on input and output shafts 1 and 2 may be switched. Further, although in the first and second embodiments the slip rings 32 and the brush device 19 are used as means for taking out a detected signal from the printed board 14 to the stationary part, it is possible to employ a curled cord type means wherein signal conductors are led out from the printed board 14 to the terminals on the stationary part while being flexibly disposed in radially swirling patterns, in place of the combination of the slip rings 32 and the brush device 19.

In the first and second embodiments, even when flexural load is applied between the input and output shafts, the slider 16 is held in contact with the resistance layer of the potentiometer 15 without any circumferential displacement. Accordingly, the displacement of the slider 16 consists of torsional deflection only, so that an accurate detection signal is obtained and it is therefore possible to conduct stable steering of the vehicle. Since the gap between the engagement groove 34d and the fixing pin 35 secured to the output shaft 2 is eliminated, the mounting ring 34 is rotated without any looseness together with the output shaft 2 when rotated, so that the degree of detection accuracy is increased.

Figure 6:
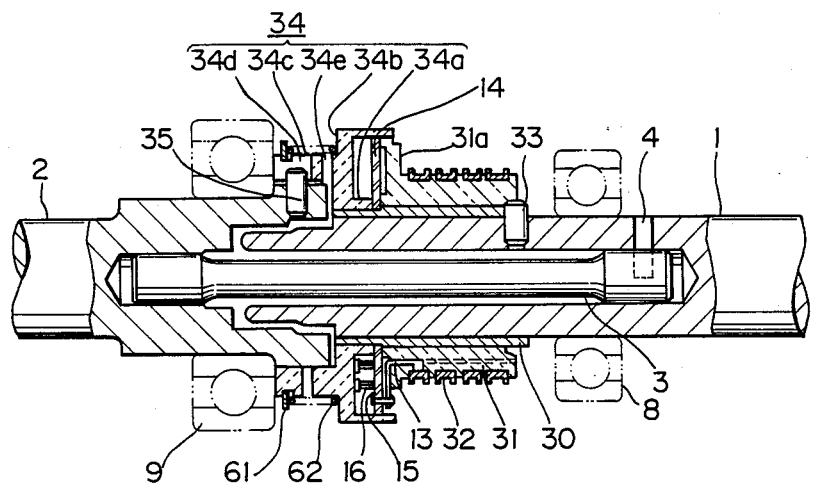
FIG. 6 is a fragmentary sectional view showing an essential part of a third embodiment of the steering torque detecting apparatus according to the present invention.
Figure 7:
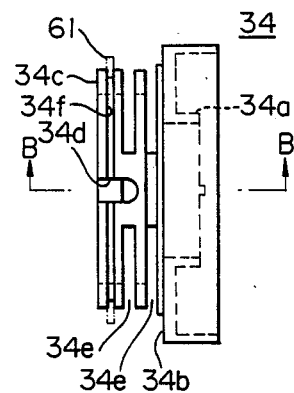
FIG. 7 is a side view of the mounting ring shown in FIG. 6.
Figure 8:
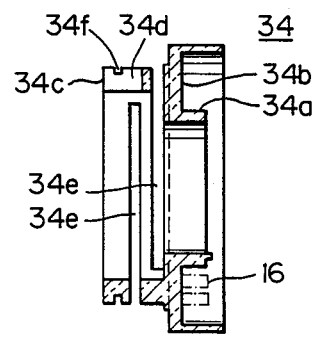
FIG. 8 is a sectional view taken along the line B—B of FIG. 7.

FIG. 6 is a fragmentary sectional view of a third embodiment of the steering torque detecting apparatus according to the present invention, while FIG. 7 is a side view of the mounting ring shown in FIG. 6, and FIG. 8 is a sectional view taken along the line B—B of FIG. 7. In FIGS. 6 to 8, the reference numerals 1 to 4, 13 to 16, 30 to 35, etc. which are common to FIG. 1 or 16 denote members that are similar to the corresponding ones shown in FIG. 1 and FIG. 16.

A disc-shaped printed board 14 is secured to the flange portion 31a, the printed board 14 having a potentiometer element 15 formed on one surface thereof. The potentiometer element 15 is provided with a circumferential resistance layer and a plurality of electrodes.

FIGS. 7 and 8 show in detail the mounting ring 34 of the steering torque detecting apparatus shown in FIG. 6. The cylindrical projecting portion 34c is provided with a plurality of slits 34e (two slits being shown in FIGS. 7 and 8) which are spaced apart from each other in the axial direction, each slit 34e extending circumferentially through a relatively wide angle. Each pair of adjacent slits 34e are disposed in such a manner that the respective circumferential centers of the slits 34e are offset from each other at 180 degrees, thereby enabling the projecting portion 34c to be elastically compressed in the axial direction. An annular groove 34f is provided in the outer periphery of the projecting portion 34c. A snap ring 61 is fitted in the annular groove 43f.

Referring back to FIG. 6, the mounting ring 34 is disposed between the inner ring of the bearing 9 for the output shaft 2 and the printed board 14, and a spring member 62 which is defined by a compression spring is fitted on the mounting ring 34 between the snap ring 61 and the flange portion 34b, so that the end of the boss portion 34a, which extends axially from the inner end face of the flange portion 34b toward the printed board 14, is held in contact with the surface of the printed board 14 under pressure.

Thus, the spring member 62 is compressingly disposed between the snap ring 61 and the flange portion 34b, so that the end of the boss portion 34a is pressed against the printed board 14 with a predetermined level of contact pressure by the spring pressure derived from the spring member 62 and the slider 16 that is retained on the inner end face of the flange portion 34b is held in contact with the resistance layer of the potentiometer with a predetermined level of contact pressure. Accordingly, it is possible to obtain an accurate detection signal independently of any flexural load applied between the input and output shafts 1 and 2.

The spring member 62 may be disposed between the end of the inner ring of the bearing 9 and the outer end of the flange portion 34b. FIG. 6 omits any illustration of the brush device that is brought into contact with the slip rings 32 to take out a detection signal.

Figure 9:
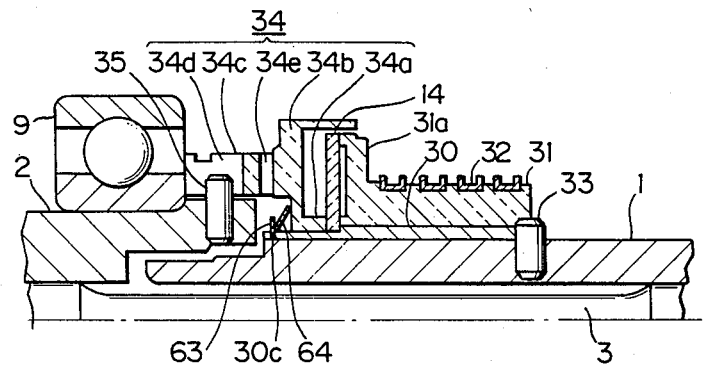
FIG. 9 is a longitudinal sectional view of a mounting ring pressing means employed in a fourth embodiment of the steering torque detecting apparatus according to the present invention.

FIG. 9 is a sectional view of a mounting ring pressing means employed in a fourth embodiment of the steering torque detecting apparatus of the present invention. An annular groove 30c is provided at one end of the bush 30, and a snap ring 63 is fitted in the groove 30c. A spring member 64 which is defined by an annular corrugated spring is disposed between the snap ring 63 and the flange portion 34b of the mounting ring 34, thus causing the end of the boss 34b to be held in contact with the surface of the printed board 14 under pressure. A coned disc spring may be employed in place of the spring member 64.

Although in the third and fourth embodiments shown in FIGS. 6 and 9, respectively, the slip rings 32 and the printed board 14 are fitted on the input shaft 1, while the mounting ring 34 is fixed on the output shaft 2 so that the mounting ring 34 is prevented from moving circumferentially relative to the output shaft 2, these arrangements of the members on the input and output shafts 1 and 2 may be switched. In the third and fourth embodiments, the end of the boss portion is allowed to slide on the surface of the printed board while being pressed against it and the slider is thus maintained in contact with the resistance layer of the potentiometer with a predetermined level of pressure. Accordingly, even when flexural load is applied between the input and output shafts, a detection signal representative only of the level of torsion generated is obtained, without any displacement of the contact position, thus enabling stable steering.

Figure 10:
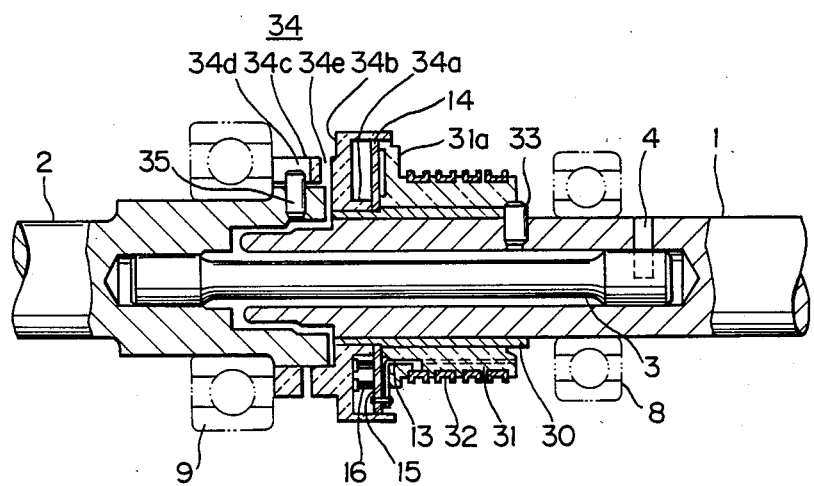
FIG. 10 is a longitudinal sectional view of an essential part of a fifth embodiment of the steering torque detecting apparatus according to the present invention.

FIG. 10 is a longitudinal sectional view of an essential part of a fifth embodiment of the steering torque detecting apparatus according to the present invention. In FIG. 10, reference numerals which are common to those used in describing the foregoing embodiments and the prior art denote like members.

A support ring 31 is formed on the outer periphery of the metallic bush 30 by a cast molding process using a synthetic resin material. A plurality of slip rings 32 are buried in the outer peripheral portion of the support ring 31. The support ring 31 is provided with a flange portion 31a. A disc-shaped printed board 14 is secured to the flange portion 31a. A potentiometer element having a circumferential resistance layer and a plurality of electrodes is formed on the surface of the printed board 14. Connecting wires 13 are led out from the respective slip rings 32. The slip rings 32, the printed board 14, etc. constitute in combination a slip ring part.

The boss portion 34a is movably fitted on the bush 30 and supported concentrically with respect to it. The slider 16 is secured to the inner end face of the flange portion 34b. The distal end of the slider 16 is in resilient contact with the resistance layer and electrodes provided on the potentiometer element 15 formed on the printed board 14. The engagement groove 34d that is provided in the mounting ring 34 is engaged with the fixing pin 35 rigidly secured to the output shaft 2, thus enabling the mounting ring 34 to rotate together with the output shaft 2 in one unit.

Figure 11:
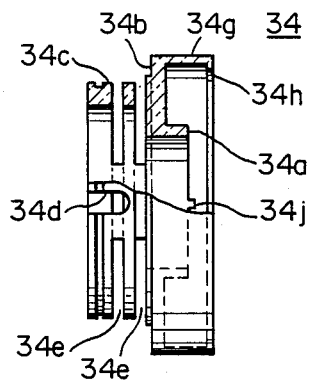
FIG. 11 is a partially sectioned plan view of the mounting ring shown in FIG. 10.

FIG. 11 shows the mounting ring 34 in detail. The cylindrical projecting portion 34c is provided with a plurality of slits 34e which are spaced apart from each other in the axial direction, each slit 34e extending circumferentially through a relatively wide angle. Each pair of adjacent slits 34e are disposed in such a manner that the respective circumferential centers of the slits 34e are offset from each other at 180 degrees, thereby enabling the projecting portion 34c to be elastically compressed in the axial direction. A cylindrical collar portion 34g is provided on the flange portion 34b of the mounting ring 34. An inwardly projecting edge portion 34h is provided at the distal end of the collar portion 34g.

The mounting ring 34 and the slip ring part are assembled together as follows. When the flange portion 31a is forced into the space defined inside the collar portion 34h of the mounting ring 34, the edge portion 34h is enlarged by virtue of elastic deformation so as to allow the flange portion 31a to enter the inner side of the edge portion 34h. Thereafter, the edge portion 34h is elastically restored to its previous position to prevent the slip ring part from disengaging from the mounting ring 34. Thus, the mounting ring 34 is movably engaged with the slip ring part.

Figure 13:
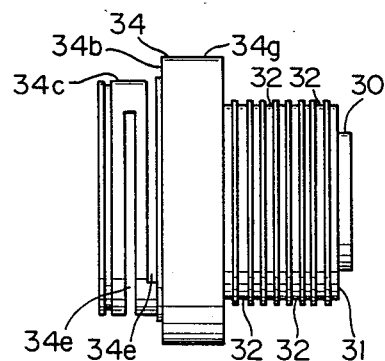
FIG. 13 is a side view showing the mounting ring and slip ring part shown in FIG. 10 which are in engagement with each other.

FIG. 13 shows the mounting ring 34 which is movably engaged with the slip ring part. After the mounting ring 34 has been movably engaged with the slip ring part, the boss portion 34a of the mounting ring 34 is fitted on the bush 30.

Figure 12:
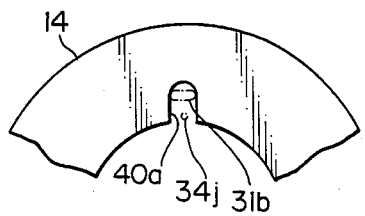
FIG. 12 is a fragmentary front view of the printed board shown in FIG. 10.

As shown in FIG. 12, a positioning groove 40a is provided in the printed board 14. The groove 40a is engaged with a positioning projection 31b which is provided on the support ring 31.

A limiting projection 34j is provided on the boss portion 34a of the mounting ring 34. The limiting projection 34j is disposed within the positioning groove 40a provided in the printed board 14, thereby limiting the rotation of the mounting ring 34 within a range in which no hindrance to torsional deflection of the torion bar 3 is caused.

The mounting ring 34 and the slip ring part are stored and transported in their assembled state and set on the input and output shafts 1 and 2 when the apparatus is to be assembled.

In the fifth embodiment shown in FIG. 10, the input and output shafts 1 and 2 may be interchanged.

In the fifth embodiment shown in FIG. 10, the flange portion 31a of the slip ring part is inserted into the mounting ring 34 while enlarging the edge portion 34h of the cylindrical collar portion 34g of the mounting ring 34. Thus, the flange portion 34a is prevented from disengaging from the mounting ring 34 by the edge portion 34h which is elastically restored to its previous position.

Accordingly, it is possible to store and transport both the slip ring part and the mounting ring as one unit and also possible to prevent intrusion of foreign matter into the area of contact between the slider and the resistance layer.

Figure 14:
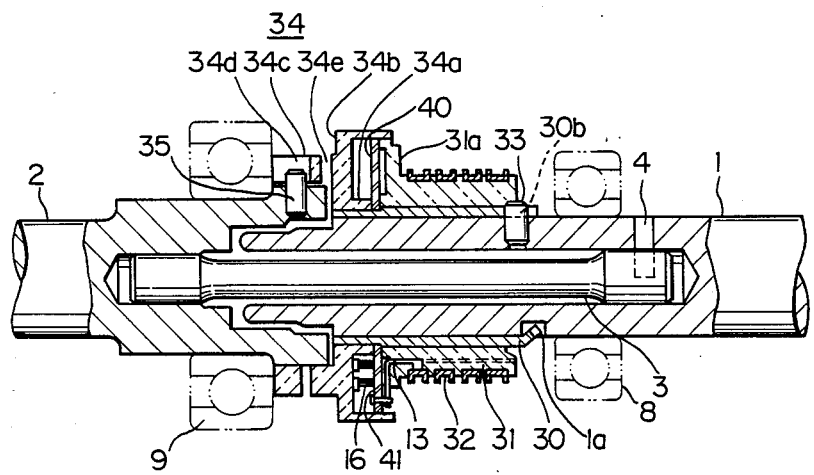
FIG. 14 is a longitudinal sectional view of an essential part of a sixth embodiment of the steering torque detecting apparatus according to the present invention.

FIG. 14 is a longitudinal sectional view of an essential part of a sixth embodiment of the steering torque detecting apparatus according to the present invention. In FIG. 14, reference numerals which are common to those used in describing the foregoing embodiments and the prior art denote like members.

A support ring 31 is formed on the outer periphery of the metallic bush 30 by a cast molding process using a synthetic resin material, for example, polybutylene terephthalate or polyamide. A plurality of slip rings 32 are buried in the outer peripheral portion of the support ring 31. Connecting wires 13 extend from the respective slip rings 32. The support ring 31 is provided with a flange portion 31a at one end thereof. A printed board 40 made of an insulating material is fitted on the bush 30 and secured to the flange portion 31a. A potentiometer element 41 is formed on the printed board 40. The potentiometer element 41 comprises a circumferentially disposed resistance layer and a plurality of electrodes which are connected to the connecting wires 13, respectively.

A positioning groove 30a which is provided in the end portion of the bush 30 is engaged with a fixing pin 33 which is secured to the input shaft 1, thereby engaging the bush 30 with the input shaft 1 so that the bush 30 is prevented from moving circumferentially relative to the input shaft 1. Further, the end portion of the bush 30 is bent so as to engage with a groove 1a provided in the input shaft 1, thereby securing the bush 30 to the input shaft 1 so that the bush 30 is prevented from moving axially relative to the input shaft 1. The end portion of the bush 30 may be bent at a plurality of positions so as to engage with the groove 1a.

Figure 15:
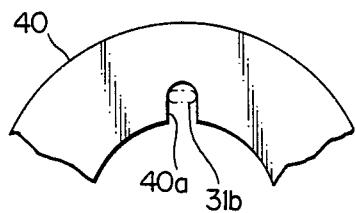
FIG. 15 is a fragmentary front view of the printed board shown in FIG. 14.

As shown in FIG. 15, a positioning groove 40 which is provided in the printed board 40 is engaged with a positioning projection 31b which is provided on the end portion of the support ring 31, the printed board 40 and the support ring 31 thereby engaging, with each other so as to be prevented from moving circumferentially relative to each other.

As shown in FIG. 14, the boss portion 34a is movably fitted on the bush 30 and supported concentrically with respect to it. A slider 16 is secured to the inner end face of the flange portion 34b. The distal end of the slider 16 is brought into resilient contact with the resistance layer and electrodes provided on the potentiometer element 41. An axially extending engagement groove 34d is provided in the cylindrical projecting portion 34c at the outer end of the flange portion 34b of the mounting ring 34. The engagement groove 34d is engaged with the fixing pin 35 rigidly secured to the output shaft 2, the mounting ring 34 with the output shaft 2 thereby engaging so as to be prevented from moving circumferentially relative to each other, and thus enabling the mounting ring 34 to rotate together with the output shaft 2 as one unit. The cylindrical projecting portion 34c of the mounting ring 34 is provided with a plurality of slits 34e which are spaced apart from each other in the axial direction, each slit 34e extending circumferentially through a relatively wide angle. Each pair of adjacent slits 34e is disposed in such a manner that the respective circumferential centers of the slits 34e are offset from each other at 180 degrees, thereby enabling the projecting portion 34c to be elastically compressed in the axial direction. The outer end of the projecting portion 34c of the mounting ring 34 abuts against the outer ring of the bearing 9, while the end of the boss portion 34a of the mounting ring 34 is brought into contact with the printed board 40. Thus, the projecting portion 34c is disposed in a compressed state between the outer ring of the bearing 9 and the printed board 40 and the end of the boss portion 34a is therefore held in contact with the printed board 40 under a predetermined level of pressure.

In the sixth embodiment of the present invention shown in FIGS. 14 and 15, the metallic bush 30 is secured to one shaft while being circumferentially positioned with respect to said shaft through engagement between the positioning groove 30a provided in the bush 30 and the fixing pin 33 provided on said shaft, and the bush 30 is axially positioned with respect to said shaft through engagement of the bent end portion of the bush 30 and the groove 1a provided in said shaft. Therefore, the interference of the bush 30 with respect to said shaft needs only to be set such as to ensure that there is no looseness in the radial direction. Accordingly, it is possible to fit the bush 30 to said shaft with ease and there is no fear of the support ring 31 cast-molded on the outer periphery of the bush 30 being cracked or fractured. In addition, the printed board 40, which is positioned both circumferentially and radially by means of the support ring 31 and the bush 30, can be circumferentially positioned with respect to said shaft with a high degree of accuracy.

What is claimed is:

1. A steering torque detecting apparatus comprising:
    a pair of input and output shafts which constitute in combination a steering shaft;
    a torsion bar coupling together said input and output shafts;
    a printed board provided with a resistance layer an electrodes, which constitute in combination a potentiometer element, said printed board being mounted on either one of said input and output shafts;
    means disposed between one of said shafts and a stationary part for taking out a detection signal from said printed board to said stationary part;
    a mounting ring made of an insulating material which is rotated together with the other shaft as one unit;
    a slider secured to the inner end face of a flange portion of said mounting ring and held in resilient contact at the distal end thereof with the resistance layer of said potentiometer element, said slider being allowed to slide through a very short distance in the circumferential direction; and
    said mounting ring being molded from a synthetic resin material and having a boss portion concentrically supported on said first shaft, a flange portion extending radially outward from said boss portion and having said slider secured to the inner end face thereof, and a cylindrical projecting portion extending axially from the outer end of said flange portion, said projecting portion being formed so as to be elastically compressible and fixed to said second shaft by fixing means so that said projecting portion is prevented from moving circumferentially relative to said second shaft, said cylindrical projecting portion being elastically retained in a compressed state on said second shaft, thereby enabling the end of said boss portion to be brought into contact with said printed board under pressure.

2. A steering torque detecting apparatus according to claim 1, wherein the cylindrical projecting portion of said mounting ring is provided with an engagement groove which extends axially from the end thereof, said engagement groove being engaged with a fixing pin which is secured to said second shaft to thereby fix said mounting ring so that said mounting ring is prevented from circumferentially moving relative to said second shaft, said cylindrical projecting portion having a spring ring fitted on the end portion of the outer periphery thereof, thereby reducing the width of said engagement groove.

3. A steering torque detecting apparatus according to claim 1, wherein the end of the boss portion of said mounting ring is extended axially from the inner end face of said flange portion and brought into contact with said printed board.

4. A steering torque detecting apparatus according to claim 1, wherein the cylindrical projecting portion of said mounting ring is provided with a plurality of circumferential slits which are offset from each other in the circumferential direction, thereby enabling said projecting portion to be elastically compressed.

5. A steering torque detecting apparatus comprising:
    a pair of input and output shafts which constitute in combination a steering shaft;
    a torsion bar coupling together said input and output shafts;
    a printed board provided with a resistance layer and electrodes, which constitute in combination a potentiometer element, said printed board being mounted on either one of said input and output shafts;
    means disposed between one of said shafts and a stationary part for taking out a detection signal from said printed board to said stationary part;
    a mounting ring made of an insulating material which is rotated together with the other shaft in one unit;
    a slider secured to said mounting ring and held in resilient contact at the distal end thereof with the resistance layer of said potentiometer element, said slider being allowed to slide through a very short distance in the circumferential direction; and
    said mounting ring being molded from a synthetic resin material and having a boss portion concentrically supported on said first shaft, a flange portion extending radially outward from said boss portion and having said slider secured to the inner end face thereof, and a cylindrical projecting portion extending axially from the outer end of said flange portion, said projecting portion being fixed to said second shaft by fixing means so that said projecting portion is prevented from moving circumferentially relative to said second shaft, said flange portion of said mounting ring being pressed from the outer end thereof by a spring member, thereby enabling the end of said boss portion to be brought into contact with said printed board under pressure.

6. A steering torque detecting apparatus according to claim 5, wherein the end of the boss portion of said mounting ring is extended axially from the inner end face of said flange portion and brought into contact with said printed board.

7. A steering torque detecting apparatus according to claim 5, wherein a spring member is disposed in a compressed state between the outer end of the flange portion of said mounting ring and a snap ring which is secured to said first shaft.

8. A steering torque detecting apparatus comprising:
a pair of input and output shafts which constitute in combination a steering shaft;
a torsion bar coupling together said input and output shafts;
a slip ring part mounted on either one of said input and output shafts, said slip ring part having a flange portion for retaining a printed board provided with a resistance layer and electrodes, which constitute in combination a potentiometer element, and a plurality of slip rings for taking out a detection signal from said printed board;
a mounting ring made of an insulating material which is rotated together with the other shaft in one unit;
a slider secured to said mounting ring and held in resilient contact at the distal end thereof with the resistance layer of said potentiometer element, said slider being allowed to slide a very short distance in the circumferential direction; and
said mounting ring being molded from a synthetic resin material and having a boss portion concentrically supported on said first shaft, a flange portion extending radially outward from said boss portion and having said slider secured to the inner end face thereof, a cylindrical projecting portion extending axially from the outer end of said flange portion, said projecting portion being fixed to said second shaft, a cylindrical collar portion provided at one end of said flange portion, and an edge portion projecting radially inward from the end of said collar portion, so that the flange portion of said slip ring part is press-fitted into the space defined within the collar portion of said mounting ring and prevented from disengaging from said mounting ring by said edge portion when elastically restored to its previous position, thereby engaging said mounting ring and said slip ring part with each other.

9. A steering torque detecting apparatus according to claim 8, wherein said mounting ring is fixed to said second shaft so that said mounting ring is prevented from moving circumferentially relative to said second shaft, said mounting ring being axially pressed toward said printed board by resilient means, thus causing the end of the boss portion of said mounting ring to be held in contact with said printed board under pressure.

10. A steering torque detecting apparatus comprising:
a pair of input and output shafts which constitute in combination a steering shaft;
a torsion bar coupling together said input and output shafts;
a printed board provided with a resistance layer and electrodes, which constitute in combination a potentiometer element, said printed board being mounted on either one of said input and output shafts;
a plurality of slip rings mounted on one of said shafts for taking out a detection signal from said printed board;
a mounting ring made of an insulating material which is rotated together with the other shaft as one unit;
a slider secured to the inner end face of a flange portion of said mounting ring and held in resilient contact at the distal end thereof with the resistance layer of said potentiometer element, said slider being allowed to slide a very short distance in the circumferential direction; and
a slip ring part comprised of a metallic bush having a positioning groove provided in one end portion thereof, a support ring formed on the outer peripheral portion of said bush by a molding process using a synthetic resin material, said support ring having said printed board retained on a flange portion which is provided at one end of said support ring, and said slip rings which are buried in the outer peripheral portion of said support ring, said slip ring part being fitted on said first shaft such that said bush is positioned circumferentially through engagement between said positioning groove and a fixing pin which is rigidly secured to said first shaft and such that the end portion of said bush is bent so as to engage with a groove provided in said first shaft, thereby fixing said bush so that said bush is prevented from moving axially relative to said first shaft.

11. A steering torque detecting apparatus according to claim 10, wherein said mounting ring is fixed to said second shaft so that said mounting ring is prevented from moving circumferentially relative to said second shaft, said mounting ring being pressed axially toward said printed board by resilient means, thus causing the end of the boss portion of said mounting ring to be held in contact with said printed board under pressure.

* * * * *